United States Patent
Anders et al.

(10) Patent No.: US 10,530,719 B2
(45) Date of Patent: Jan. 7, 2020

(54) EMOTIVE TONE ADJUSTMENT BASED COGNITIVE MANAGEMENT

(71) Applicant: International Business Machines Corporation, Armonk, NY (US)

(72) Inventors: Kelley Anders, East New Market, MD (US); Jeremy R. Fox, Georgetown, TX (US); Liam S. Harpur, Skerries (IE); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 15/814,988

(22) Filed: Nov. 16, 2017

(65) Prior Publication Data
US 2019/0149494 A1    May 16, 2019

(51) Int. Cl.
*G06F 17/24* (2006.01)
*H04L 12/58* (2006.01)
(Continued)

(52) U.S. Cl.
CPC ........ *H04L 51/046* (2013.01); *G06F 17/2785* (2013.01); *H04W 4/12* (2013.01)

(58) Field of Classification Search
CPC .......... G06F 17/24; G06F 17/20; G06F 17/21; G06F 17/2276; G06F 17/243;
(Continued)

(56) References Cited

U.S. PATENT DOCUMENTS

| 9,576,175 B2 * | 2/2017 | Chembula ................. G06K 9/00 |
| 2007/0208569 A1 * | 9/2007 | Subramanian ...... G10L 19/0018 |
| | | 704/270 |

(Continued)

FOREIGN PATENT DOCUMENTS

CN        104753978 A      7/2015

OTHER PUBLICATIONS

National Institute of Standards and Technology; The NIST Definition of Cloud Computing; Special Publication 800-145; Dec. 13, 2016; pp. M-7 to M-13.

*Primary Examiner* — Qi Han
(74) *Attorney, Agent, or Firm* — Garlick & Markison; Timothy W. Markison; Shayne X. Short

(57) ABSTRACT

A computing device includes an interface configured to interface and communicate with a communication system, a memory that stores operational instructions, and processing circuitry operably coupled to the interface and to the memory that is configured to execute the operational instructions to perform various operations. The computing device processes a message that is provided from a sender and is intended for a recipient associated with another computing device in accordance with topic, emotive content, and/or social content to generate a classification model for the message that includes classification parameter value(s). When appropriate to perform message transformation, the computing device selects a tonal transformation based on the classification parameter value(s) and processes the message in accordance with the tonal transformation to generate a normalized message. The computing device processing circuitry then forwards the normalized message to another computing device to be consumed by the recipient associated with the other computing device.

20 Claims, 7 Drawing Sheets

(51) Int. Cl.
*H04W 4/12* (2009.01)
*G06F 17/27* (2006.01)

(58) Field of Classification Search
CPC ...... G06F 17/245; G06F 17/248; G06F 17/25;
G06F 17/277; G06F 17/279; G06F 17/28;
G06F 17/2872; G06F 17/2881; G06F
17/30
USPC .......................... 704/9, 1, 2, 4, 10, 277, 278
See application file for complete search history.

(56) References Cited

U.S. PATENT DOCUMENTS

2015/0266377 A1    9/2015  Hampiholi et al.
2018/0069820 A1*   3/2018  Asghari Kamrani ... H04L 51/24

* cited by examiner

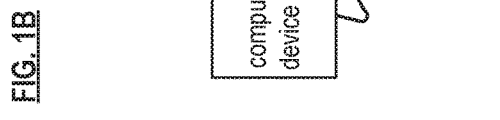
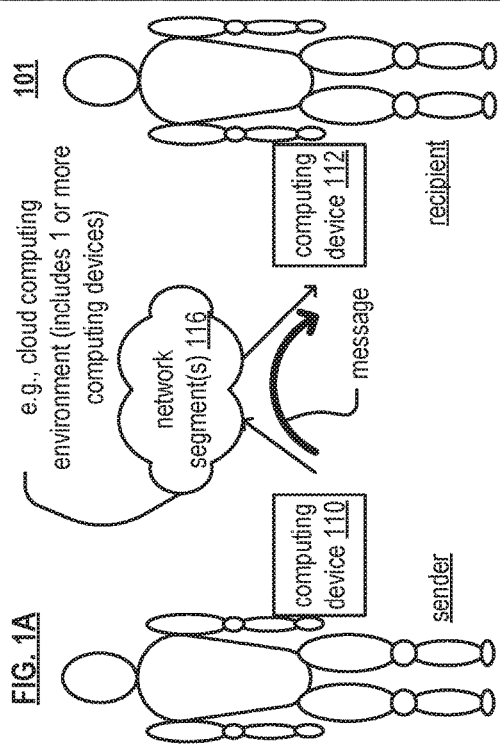
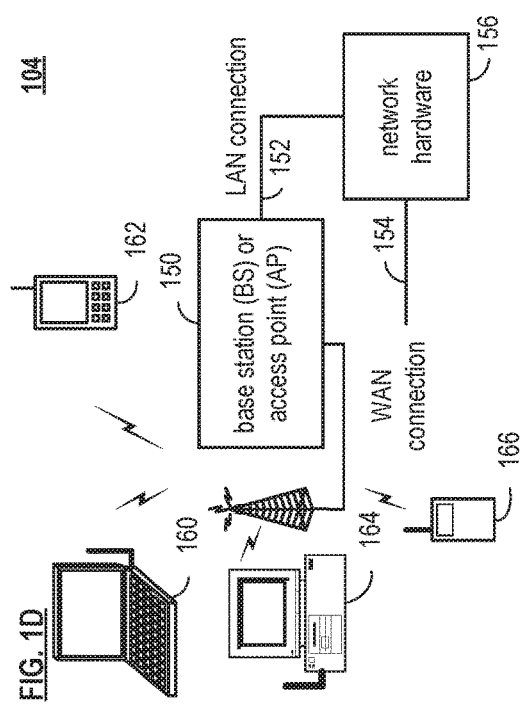
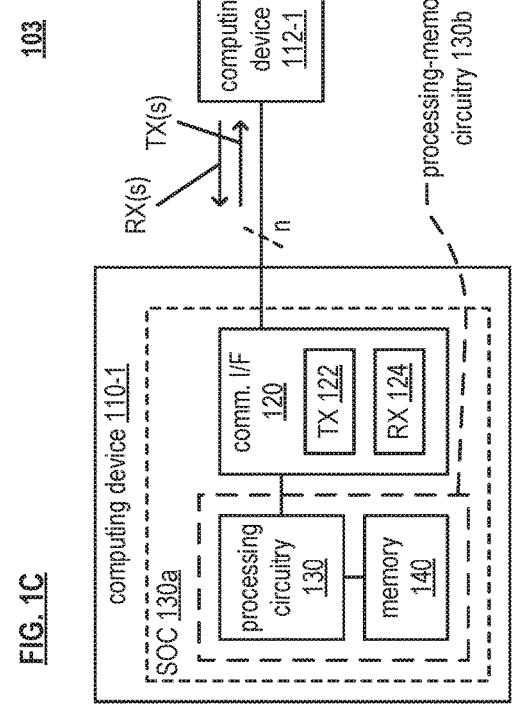

EMOTIVE TONE ADJUSTMENT BASED COGNITIVE MANAGEMENT

BACKGROUND

This invention relates to message processing, and more specifically, to selective modification of messages in accordance with message processing based on various considerations such as topic, emotive content, and/or social content and recipient activity and/or status.

In prior art messaging systems, a sender transmits a message to a recipient. The recipient receives the message in accordance with the communication system implemented to support such messaging. In some situations, a recipient may be unable to receive such a message without distraction. For example, if the recipient is occupied with another activity, the performance of the recipient in the activity may be adversely affected if the recipient is distracted with message receipt and/or notification thereof. The prior art fails to provide adequate solutions to support messaging between users (e.g., senders and recipients) in a manner that effectively supports such messaging and also does not adversely affect the recipient when occupied with another activity.

SUMMARY

Embodiments of the present invention disclose a computer-implemented method, a system, and a computer program product for selective and adaptive message modification including emotive tone adjustment. A message that is provided from a sender and is intended for a recipient associated with another computing device is processed in accordance with topic, emotive content, and/or social content to generate a classification model for the message that includes one or more classification parameter values. When the classification model for the message compares favorably to an emotive normalization model, a tonal transformation is selected from a plurality of tonal transformations based on the one or more classification parameter values. The message is processed in accordance with the tonal transformation that is selected from the plurality of tonal transformations to generate a normalized message. The normalized message is forwarded to the other computing device to be consumed by the recipient associated with the other computing device.

BRIEF DESCRIPTION OF THE DRAWINGS

FIG. 1A is a diagram illustrating an embodiment of one or more communication system supporting messaging according to various embodiments of the present invention;

FIG. 1B is a diagram illustrating an embodiment of one or more communication systems according to various embodiments of the present invention;

FIG. 1C is a diagram illustrating an embodiment of a computing device configured to be operated within one or more communication systems according to various embodiments of the present invention;

FIG. 1D is a diagram illustrating an embodiment of a wireless communication system according to various embodiments of the present invention;

DETAILED DESCRIPTION

Figure 2:
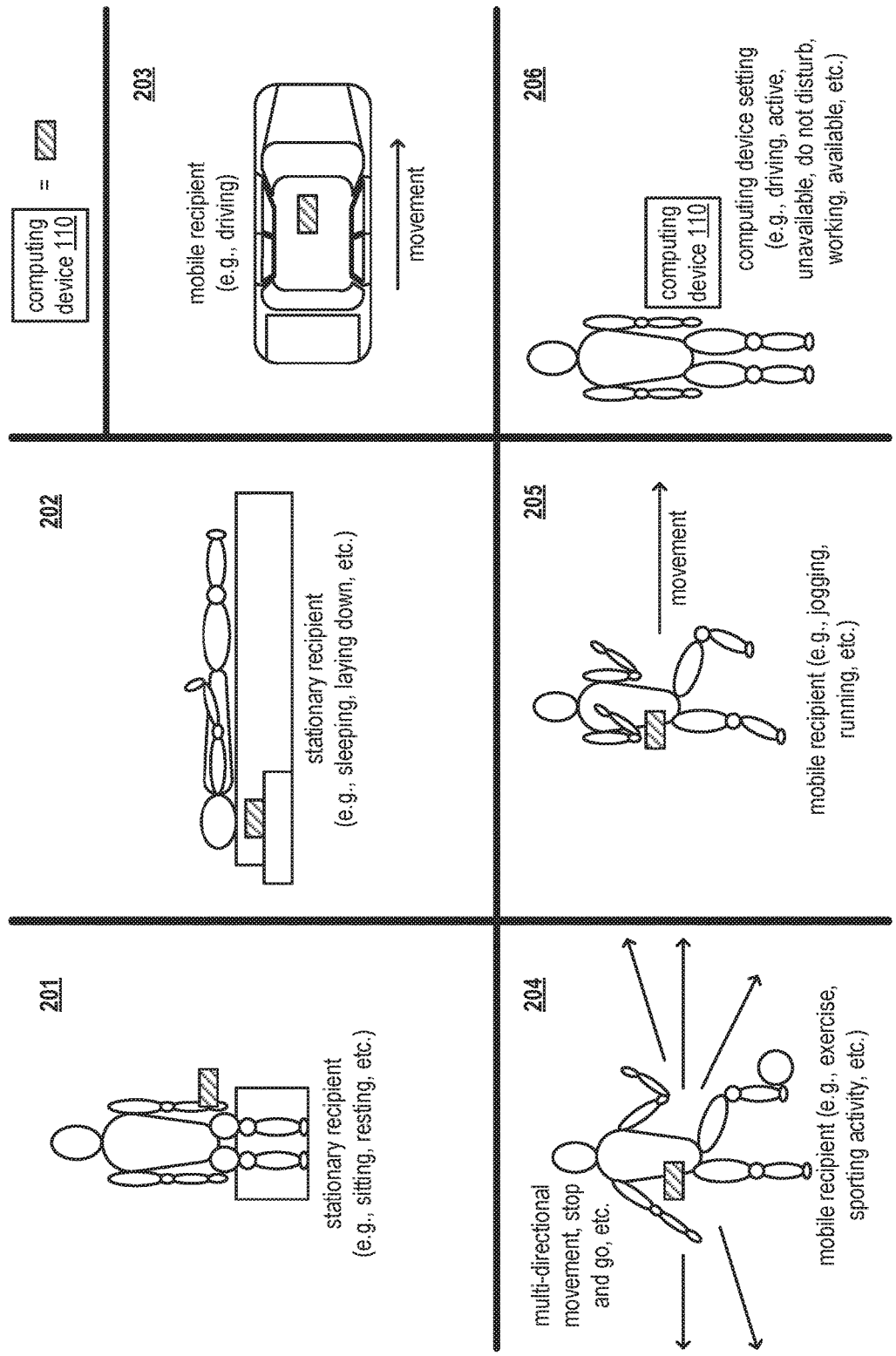
FIG. 2 is a diagram illustrating various examples of user activity and/or computing device setting as related to messaging according to various embodiments of the present invention.

According to an embodiment of the present invention, novel message processing operates by processing a message sent from a first computing device (e.g., associated with a sender) to a second computing device (e.g., a recipient) and selectively to deliver the message without modification or modify the message and/or delivery thereof. For example, this novel message processing operates by processing a message that is provided from a sender and is intended for a recipient associated with another computing device in accordance with topic, emotive content, and/or social content to generate a classification model for the message that includes one or more classification parameter values. When the classification model for the message compares favorably to an emotive normalization model, this novel message processing operates by selecting a tonal transformation from a plurality of tonal transformations based on the one or more classification parameter values and processing the message in accordance with the tonal transformation that is selected from the plurality of tonal transformations to generate a normalized message. This novel message processing operates by forwarding the normalized message to the other computing device to be consumed by the recipient associated with the other computing device.

FIG. 1A is a diagram illustrating an embodiment 100 of one or more communication system supporting messaging according to various embodiments of the present invention. A computing device 110 is in communication with a computing device 112 via one or more network segments 116. The computing device 110 is associated with a sender, and the computing device 112 is associated with a recipient. The one or more network segments 116 may be implemented in accordance with a cloud computing environment 50 such as described with reference to FIG. 5, and one or more network segments 116 may include one or more other computing devices therein (e.g., nodes, routers, gateways, servers, relays, transcoders, etc.) in some examples and/or embodiments.

In an example of operation and implementation, the computing device 110 is configured to transmit a message to the computing device 112. For example, a sender (e.g., a user, owner, etc.) of the computing device 110 generates and transmits (e.g., via user input via an interface such as a user interface of the computing device 110) a message to a recipient (e.g., a user, owner, etc.) of the computing device 112. The message is conveyed via the one or more network segments 116. Within the one or more network segments 116, one or more computing devices operate selectively to process the message based on various considerations. For example, one or more computing devices within the one or more network segments 116 processes the message based on the status, activity, etc. of the recipient and/or topic, emotive content, social content, etc. of the message.

In an example of operation and implementation, a computing device includes an interface configured to interface and communicate with a communication system, memory that stores operational instructions, and processing circuitry operably coupled to the interface and to the memory to perform various operations, functions, etc. including transmitting and receiving of signals, processing of signals, etc. For example, the processing circuitry is configured to execute the operational instructions to process a message that is provided from a sender (e.g., from the computing device 110) and is intended for a recipient associated with the computing device 112 in accordance with topic, emotive content, and/or social content to generate a classification model for the message that includes one or more classification parameter values. When the classification model for the message compares favorably to an emotive normalization model, the processing circuitry is configured to execute the operational instructions to select a tonal transformation from a plurality of tonal transformations based on the one or more classification parameter values. The processing circuitry is then configured to execute the operational instructions to process the message in accordance with the tonal transformation that is selected from the plurality of tonal transformations to generate a normalized message and to forward the normalized message to the computing device 112 to be consumed by the recipient associated with the computing device 112.

In some examples, the processing circuitry is also configured to execute the operational instructions to determine a current activity associated with the recipient associated with the computing device 112. When at least one of the one or more classification parameter values compares favorably to an emotive content threshold and when the current activity associated with the recipient associated with the computing device 112 compares favorably to at least one message-consuming-prohibited activity, forward the normalized message to the computing device 112 when the current activity associated with the recipient associated with the computing device 112 has ended and no other activity associated with the recipient associated with the computing device 112 compares favorably to the at least one message-consuming-prohibited activity.

In other examples, the processing circuitry is also configured to execute the operational instructions to determine a current activity associated with the recipient associated with the computing device 112. Then, when at least one of the one or more classification parameter values compares favorably to an emotive content threshold and when the current activity associated with the recipient associated with the computing device 112 compares favorably to at least one message-consuming-permitted activity, the processing circuitry is configured to execute the operational instructions to forward the normalized message to the computing device 112 to be read aloud for consumption by the recipient associated with the computing device 112.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Note that the one or more network segments 116 may be implemented in accordance with a cloud computing environment 50 such as described with reference to FIG. 5. Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, device 110 includes a communication interface to support communications with one or more of the other devices 112-114. In an example, the computing device 110 includes a communication interface configured to interface and communicate with a communication network (e.g., the one or more network segments 116), memory that stores operational instructions, and a processor coupled to the communication interface and to the memory. The processor is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processor that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

In an example of operation, computing device 110 is configured to transmit a message to computing device 112. One or more computing devices implemented within the communication system that includes the one or more network segments 116 (or alternatively another computing device that is in communication with the one or more network segments 116 such as computing device 114) is configured to process the message that is provided from the computing device 110 to the computing device 112 in accordance with various considerations that may include topic, emotive content, and/or social content to generate a classification model for the message that includes one or more classification parameter values. When the classification model for the message compares favorably to an emotive normalization model, the one or more computing devices is configured to select a tonal transformation from a plurality of tonal transformations based on the one or more classification parameter values and to process the message in accordance with the tonal transformation that is selected from the plurality of tonal transformations to generate a normalized message. The one or more computing devices is also configured to forward the normalized message to the computing device 112 to be consumed by the recipient associated with the computing device 112.

FIG. 1C is a diagram illustrating an embodiment 103 of a computing device configured to be operated within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130*a* configured to perform various operations. In even other examples, the computing device 110-1 includes processing-memory circuitry 130*b* configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

Note also that the communication interface 120 may include functionality to support receipt of user input and output user output (e.g., via a touchscreen, a keyboard, audio and/or video input/output ports, etc.) to facilitate interaction with one or more users of the computing device 110-1. Such functionality is implemented separately from the communication interface 120 in some examples and is integrated into the communication interface 120 in other examples.

The processing circuitry 130 is configured to execute the operational instructions to perform various functions, operations, and processes (sometimes in cooperation with the communication interface 120 and/or the memory 140). In an example, the processing circuitry 130 is configured to process a message that is provided from a sender and is intended for a recipient associated with computing device 112-1 in accordance with topic, emotive content, and/or social content to generate a classification model for the message that includes one or more classification parameter values. When the classification model for the message compares favorably to an emotive normalization model, the processing circuitry 130 is configured to select a tonal transformation from a plurality of tonal transformations based on the one or more classification parameter values. Then, the processing circuitry 130 is configured to process the message in accordance with the tonal transformation that is selected from the plurality of tonal transformations to generate a normalized message and forward the normalized message to the computing device 112-1 to be consumed by the recipient associated with the computing device 112-1.

FIG. 1D is a diagram illustrating an embodiment 100 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., pointto-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, a user of WDEV 166 transmits a message to a user of WDEV 162 that is transmitted via the one or more BSs or APs 150 and/or the network hardware 156. One or more computing devices (e.g., the one or more BSs or APs 150 and/or one computing devices implemented within the network hardware 156) is configured to process a message that is provided from the user of WDEV 166 and is intended for the user of WDEV 162 in accordance with topic, emotive content, and/or social content to generate a classification model for the message that includes one or more classification parameter values. When the classification model for the message compares favorably to an emotive normalization model, the one or more computing devices is configured to select a tonal transformation from a plurality of tonal transformations based on the one or more classification parameter values. Then, the one or more computing devices is configured to process the message in accordance with the tonal transformation that is selected from the plurality of tonal transformations to generate a normalized message and forward the normalized message to the user of WDEV 162 to be consumed by the recipient associated with the user of WDEV 162.

FIG. 2 is a diagram illustrating various examples 201-206 of user activity and/or computing device setting as related to messaging according to various embodiments of the present invention. Note that message processing as described herein may be performed based not only based on topic, emotive content, and/or social content of the message but also, in addition to, or alternatively based on activity, status, condition, relationship, etc. of the recipient including with reference to any such considerations relative to or in comparison to the sender. Examples of activities of a user of a computing device (e.g., a user thereof, an owner thereof, an authorized user thereof, etc.) may participate in one or more activities while being associated with the computing device. For example, a recipient in accordance with messaging services may be a stationary recipient such as sitting or resting (reference numeral 201) or sleeping or laying down (reference numeral 202). Alternatively, a recipient in accordance with messaging services may be a mobile recipient such as driving in a vehicle (reference numeral 203), exercising or participating in a sporting activity (reference numeral 204), or jogging or running (reference numeral 205). Note also that various activities may have different characteristics in terms of mobility. For example, a mobile recipient such as exercising or participating in certain sporting activity may conduct multi-directional movement and include stop and go activity, rapid changes of direction in movement (e.g., such as in accordance with soccer, basketball, etc. type of sporting activities). Alternatively, a mobile recipient such as exercising or participating in certain other sporting activity may conduct generally uni-directional movement (e.g., at least during certain periods, such as in accordance with running, jogging, etc. type of sporting activities). A mobile recipient such as driving a vehicle will typically be moving at a much faster rate (e.g., 35 miles per hour (MPH), 55 MPG, 65 MPH, etc.) than a mobile recipient participating in sporting activities. A mobile recipient such as riding a bicycle will typically be moving more slowly (e.g., 5 MPH, 10 MPH, 25 MPG, etc.) than when in a vehicle yet faster than a mobile recipient participating in sporting activities. Analysis of such movement of a computing device associated with a user in terms of directionality of movement, rate of movement, etc. to determine one or more characteristics of the type of activity in which the user is participating.

Also, in even other examples, a user of a computing device 110 enables, selects, etc. a setting of the computing device 110 that overrides any actual activity in which the user may be participating. In one example, a user enables, selects, etc. a do not disturb setting. In another example, a user enables, selects, etc. an available setting (e.g., perhaps even if the user is occupied with some other activity). Examples of other setting may include settings corresponding to one or more of actual actives or sleeping, running, driving, working, resting, etc. This option of allowing a user to user enable, select, etc. a setting can provide the user flexibility to guarantee that message processing as described herein will be performed in accordance with and based on any desired user-enabled, user-selected, etc. setting.

In some examples, one or more computing devices processing a message sent from a sender and intended for a recipient considers the activity of the recipient to determine whether and how to modify the message before delivery to the recipient. There are instances in which the delivery of the message is delayed until the recipient is able to receive the message without undue distraction, and there are instances in which the content of the message is selectively modified and then delivered to the recipient so that the recipient is able to receive the message in its modified form without undue distraction.

In some examples, a computing device is configured to process an incoming message (e.g., sent from a sender and intended for a recipient) in accordance with analysis for topic, emotive, and/or social content. For example, the message may be processed using any of a variety of methods of content analysis (e.g., latent Dirichlet allocation (LDA), IBM Watson™ AlchemyLanguage Application Program Interface (API), tone Analyzer, natural language toolkit (nltk) framework, etc.) to generate a message model for the incoming message. In general, such analysis may be performed for multiple message to generate different respective message models for each of a number of incoming messages.

Then, the one or more computing devices operates is configured to use a messaging arbitration system to determine whether the message requires emotive normalization based on any of one or more considerations that may include activity of a recipient of the message. For messages with high emotive content, a transformation is selected and applied to the message before delivery of the modified message to the recipient.

In some examples, a computing device is configured to output a message (e.g., read a received aloud for audible consumption). In some instances, the message is transformed, at least in part, to modify the emotive content thereof. For example, a message that contain certain characteristics (e.g., topic, emotive content, and/or social content, etc.) may be disruptive to a recipient when the recipient is performing or participating in one or more activities. As such, various aspects, embodiments, and/or examples of the invention as presented herein provide for modification of content and/or delivery of a message based on certain considerations.

For example, one or more characteristics (e.g., the persona of a message) is analyzed and the message may be selectively modified and/or delivery thereof may be modified appropriately. In some examples, the emotive content of a message is reduced to mitigate, reduce, and/or eliminate, etc. the risk of distraction to the recipient while the recipient is engaged in one or more specific activities. Note that one or more message transformation templates can be derived based on a consideration (e.g., triangulation in some embodiments) of the sender (e.g., caller), the recipient (e.g., the callee), the topic of the message, and current activity of the recipient.

Figures 3A, 3B, 3C:
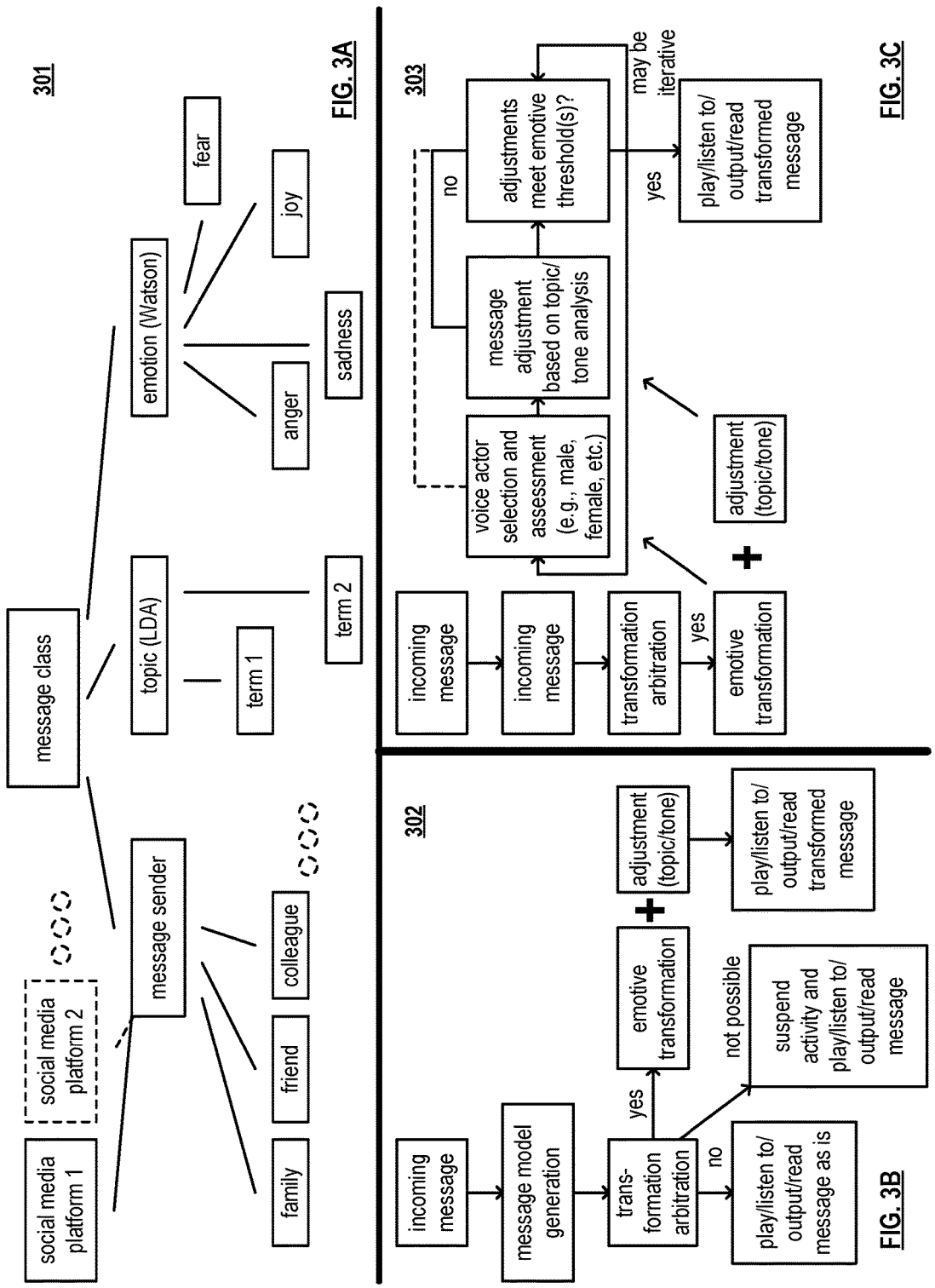
FIG. 3A is a diagram illustrating an example of message processing according to various embodiments of the present invention.
FIG. 3B is a diagram illustrating another example of message processing according to various embodiments of the present invention.
FIG. 3C is a diagram illustrating another example of message processing according to various embodiments of the present invention.

FIG. 3A is a diagram illustrating an example 301 of message processing according to various embodiments of the present invention. Generally speaking, a message is transmitted from a sender to a recipient. Such messages may take a variety of forms including text messages, application notifications, emails, voice mails converted to text, voice texts, etc. The message is received as input data to one or more computing devices that is configured to process the message to determine characteristics thereof (e.g., topic, emotive content, and/or social content, etc.).

The one or more computing devices is configured to process the message that is provided from a sender to a recipient (e.g., from a first computing device 110 to a second computing device). In some examples, the processing is performed in accordance with various considerations that may include topic, emotive content, and/or social content to generate a classification model for the message that includes one or more classification parameter values.

For example, the message intended for a recipient is analyzed for emotive content. Such analysis may be processed using any of a variety of methods of content analysis (e.g., latent Dirichlet allocation (LDA), IBM Watson™ AlchemyLanguage Application Program Interface (API), tone Analyzer, natural language toolkit (nltk) framework, etc.). In addition to or alternatively, the message undergoes analysis for topic content.

Then, based on the analysis of the message that is performed, a message model for the message is derived. In one example, a message model is based on Latent Class Analysis (LCA) as shown in FIG. 3A. Generally, Latent Class Analysis (LCA) may be described as being a statistical method for identifying unmeasured class membership among subjects using categorical and/or continuous observed variables. For example, considering the emotive characteristics of a message, various types of emotive characteristics may include anger, sadness, disgust, joy, fear, etc. among other types of possible emotive characteristics. Other characteristics that may be considered are the avenue by which a message is received (e.g., via a social media platform such as Twitter, Facebook, etc. as shown by social media platform 1 and/or social media platform 2). The topic of the message may be estimated based on a content analysis approach (e.g., LDA) based on one or more terms (e.g., as shown by term 1 and/or term 2 of the message). Other characteristics that may be considered are the sender of the message in relationship to the recipient (e.g., a family member, a friend, a colleague, etc.). Based on any one or more of such considerations, the one or more classification parameter values is determined.

Then, with the message model derived, the one or more classification parameter values may be viewed as being in tabular form to assist in the selection, arbitration, etc. of what type of transformation is to be applied to the message (e.g., if any is transformation is needed).

For example, consider the following table:

TABLE 1 example of sample messages, based on the topic likelihood and emotive relevance scores we can create a classification model to infer what the follow steps should be.

| Sender | Mary | Frank | Jane |
|---|---|---|---|
| Message | Dear John, I'm leaving you. | John, our lottery Numbers have just won a 1,000,000 jackpot. Can you believe it? | John did you forget to leave the trash bins out again this morning? |
| Term/likelihood | rejection, spouse/0.5687 | prize, jackpot/0.6899 | incomplete, task/0.5788 |
| Anger relevance | 0.8979 | 0.001 | 0.456 |
| Disgust | 0.8989 | 0.0002 | 0.345 |
| Fear relevance | 0.034 | 0.001 | 0.001 |
| Joy relevance | 0.001 | 0.999 | 0.001 |
| Sadness relevance | 0.2023 | 0 | 0.021 |
| Current activity | Driving (Motorway) | Driving | Running |
| Outcome | Delay message until John has reached destination or safe parking area | Apply joy reduction transformation, remove lottery jackpot, replace with "we got lucky and won a prize" | Read message aloud, reduce the emphasis on anger and disgust |

Consider also the make-up of a number of classifiers in the following table.

TABLE 2

| Classification | Message | Outcome |
|---|---|---|
| Driving-Delay Message | Dear John, I'm leaving you. | Delay message until John has reached destination or safe parking area |
| Joy Reduction | John, our lottery numbers have just won a 1,000,000 jackpot. Can you believe it? | Apply tone reduction of 0.5 |
| Anger Reduction | John did you forget to leave the trash bins out again this morning | Read message aloud, reduce the emphasis on anger and disgust |
| Fear Reduction | John did you forget to leave the trash bins out again this morning | Read message aloud, reduce the emphasis on anger and disgust |
| Disgust Reduction | John did you forget to leave the trash bins out again this morning | Read message aloud, reduce the emphasis on anger and disgust |
| Sadness Reduction | John did you forget to leave the trash bins out again this morning | Read message aloud, reduce the emphasis on anger and disgust |
| Topic Adjustment | John, our lottery numbers have just won a 1,000,000 jackpot. Can you believe it? | Remove lottery jackpot, replace with "we got lucky and won a prize" |

When the classification model for the message compares favorably to an emotive normalization model, the one or more computing devices is configured to select a tonal transformation from a plurality of tonal transformations based on the one or more classification parameter values and to process the message in accordance with the tonal transformation that is selected from the plurality of tonal transformations to generate a normalized message. The one or more computing devices is also configured to forward the normalized message to the second computing device to be consumed by the recipient associated with the second computing device.

In some examples, the one or more computing devices is also configured to determine a current activity associated with the recipient associated with another computing device. Then, when at least one of the one or more classification parameter values compares favorably to an emotive content threshold and when the current activity associated with the recipient associated with the other computing device compares favorably to at least one message-consuming-prohibited activity, the one or more computing devices is also configured forward the normalized message to the other computing device when the current activity associated with the recipient associated with the other computing device has ended and no other activity associated with the recipient associated with the other computing device compares favorably to the at least one message-consuming-prohibited activity.

In other examples, the one or more computing devices is also configured to determine a current activity associated with the recipient associated with the other computing device. When at least one of the one or more classification parameter values compares favorably to an emotive content threshold and when the current activity associated with the recipient associated with the other computing device compares favorably to at least one message-consuming-permitted activity, the one or more computing devices is also configured to forward the normalized message to the other computing device to be read aloud for consumption by the recipient associated with the other computing device.

Also, in some other examples, when at least one of the one or more classification parameter values compares favorably to a first emotive content threshold, the one or more computing devices is also configured to select a first tonal transformation from the plurality of tonal transformations based on the one or more classification parameter values, wherein the first tonal transformation includes a first amount of tonal reduction. The one or more computing devices is also configured to process the message in accordance with the first tonal transformation that is selected from the plurality of tonal transformations to generate the normalized message. Then, when at least one of the one or more classification parameter values and/or at least one other of the one or more classification parameter values compares favorably to a second emotive content threshold, the one or more computing devices is also configured to select a second tonal transformation from the plurality of tonal transformations based on the one or more classification parameter values, wherein the second tonal transformation includes a second amount of tonal reduction that is different than the first amount of tonal reduction. Then, the one or more computing devices is also configured to process the message in accordance with the second tonal transformation that is selected from the plurality of tonal transformations to generate the normalized message.

Note that the one or more classification parameter values of the classification model for the message are based on anger relevance, disgust relevance, joy relevance, and/or sadness relevance.

Also, in some examples, when the classification model for the message compares favorably to an emotive normalization model, the one or more computing devices is also configured to select the tonal transformation from the plurality of tonal transformations based on the one or more classification parameter values, the sender, the recipient, the topic, the emotive content, and the social content, and a current activity associated with the recipient associated with the other computing device.

FIG. 3B is a diagram illustrating another example 302 of message processing according to various embodiments of the present invention. In accordance with this sample workflow, an incoming message is received, then a message model is generated therefor, and then determination is made of whether to perform any transformation arbitration. Based on a determination not to perform any transformation to the message (no), the message is played/listened to/output/read as is without modification. Alternatively, based on a determination to perform a transformation to the message (yes), the message undergoes emotive transformation plus topic adjustment to generate a transformed message, and the transformed message is played/listened to/output/read. Alternatively, when transformation arbitration determined that it is not possible adequately is not possible to perform any emotive transformation to generate a transformed message that is suitable for delivery to a recipient based on an activity of the recipient, the message is played/listened to/output/read when the recipient has suspended the activity and may suitably consume the message. As can be seen in accordance with this sample workflow, a transformation is applied to messages with high emotive content.

FIG. 3C is a diagram illustrating another example 303 of message processing according to various embodiments of the present invention. In accordance with this sample workflow, an incoming message is received, then a message model is generated therefor, and then based on transformation arbitration, it is determined to perform emotive transformation and/or topic adjustment to the message to generate a normalized message.

In accordance with such operations, voice actor selection and assessment (e.g., whether to use a male voice, female voice, etc.) and/or text adjustment is performed based on the topic analysis. Then, after one or more of the emotive transformation and/or topic adjustment is made to the message to generate a normalized message, further determination may be made regarding whether the adjustments meet one or more emotive thresholds. If yes, then the modified or normalized message is played/listened to/output/read. Alternatively, if the adjustments do not meet one or more emotive thresholds, then one or more additional emotive transformations and/or topic adjustments are made to the message to generate a further normalized message. This process can be performed iteratively a number of times or until the adjustments acceptably meet one or more emotive thresholds, and then when one of those conditions is met, the modified or normalized message is played/listened to/output/read.

For example, in accordance with this implementation, once it is decided that a transformation is to be performed, the system flow of this diagram is used to generate an acceptable message to be played/listened to/output/read. When the arbitration system has determined that an adjustment is needed, a voice actor (e.g., male/female) is selected and then adjustment is made to the message tone via text/topic analysis. Then, the message is cross-validated to ensure it meets one or more required emotive thresholds. If not, an additional voice actor is selected and/or additional the textual content of the message is adjusted. Once the message meets the required emotive threshold the message is played.

Figure 4:
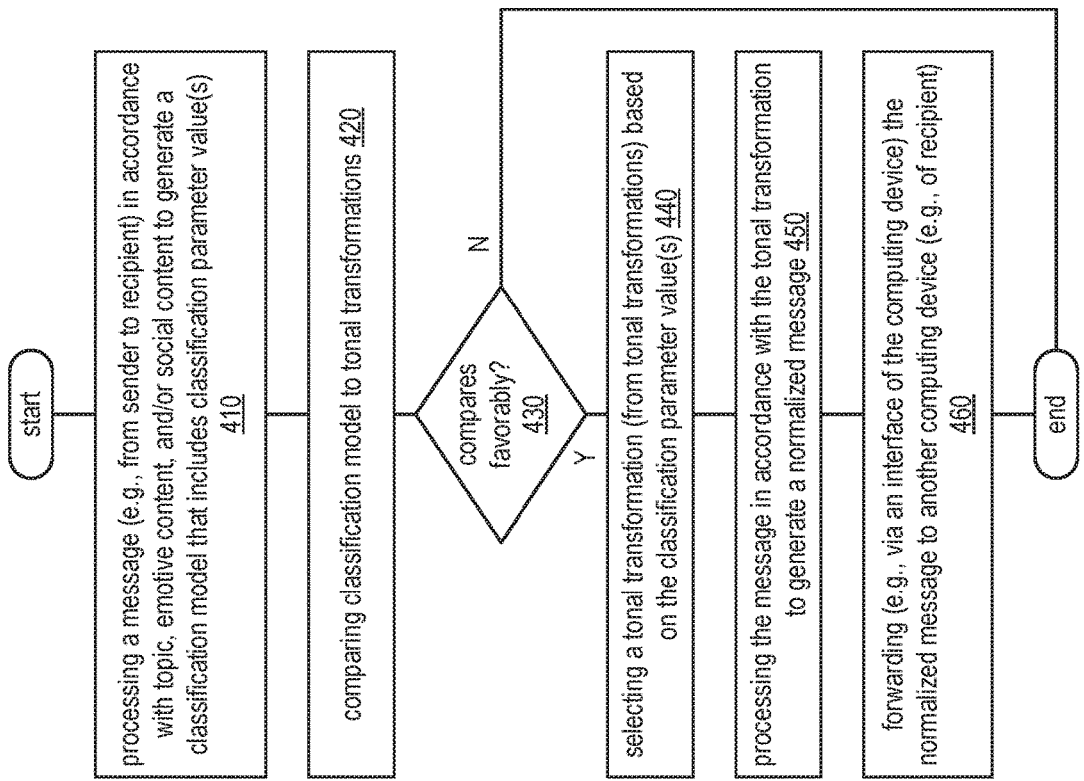
FIG. 4 is a diagram illustrating an embodiment of a method for execution by one or more computing devices according to various embodiments of the present invention.

FIG. 4 is a diagram illustrating an embodiment of a method 400 for execution by one or more computing devices according to various embodiments of the present invention. The method 400 operates in step 410 by processing a message that is provided from a sender and is intended for a recipient associated with another computing device in accordance with topic, emotive content, and/or social content to generate a classification model for the message that includes one or more classification parameter values. The method 400 continues in step 400 by comparing the classification model to a plurality of tonal transformations.

When the classification model for the message fails to compare favorably to an emotive normalization model in step 430, the method 400 ends.

When the classification model for the message compares favorably to an emotive normalization model in step 430, the method 400 operates in step 440 by selecting a tonal transformation from a plurality of tonal transformations based on the one or more classification parameter values. The method 400 continues in step 400 by processing the message in accordance with the tonal transformation that is selected from the plurality of tonal transformations to generate a normalized message. The method 400 then operates in step 400 by forwarding (e.g., via an interface of the computing device that is configured to interface and communicate with a communication system) the normalized message to another computing device to be consumed by the recipient associated with the other computing device.

Figure 5:
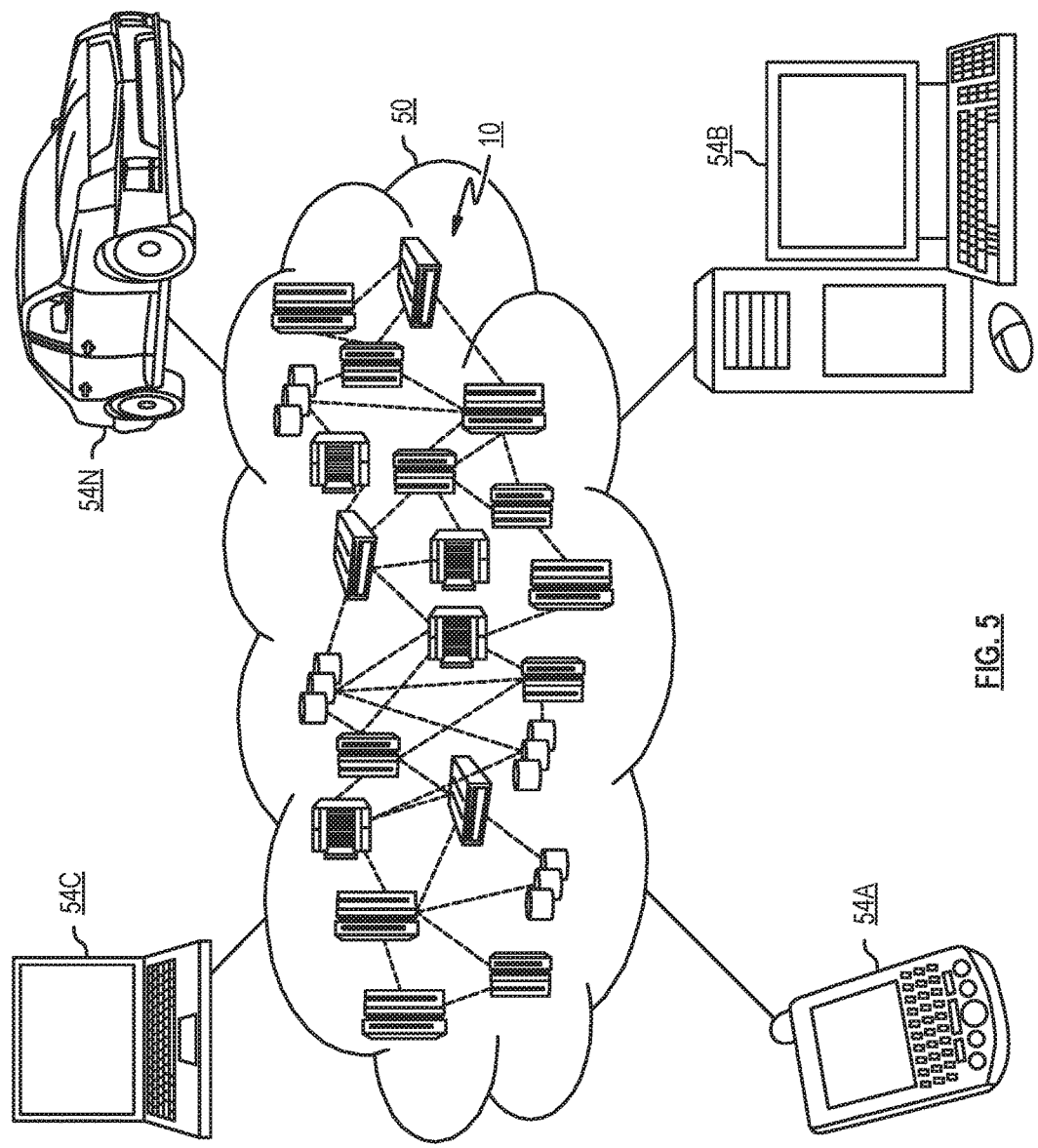
FIG. 5 depicts a cloud computing environment according to various embodiments of the present invention.

FIG. 5 depicts a cloud computing environment according to various embodiments of the present invention. FIG. 5 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
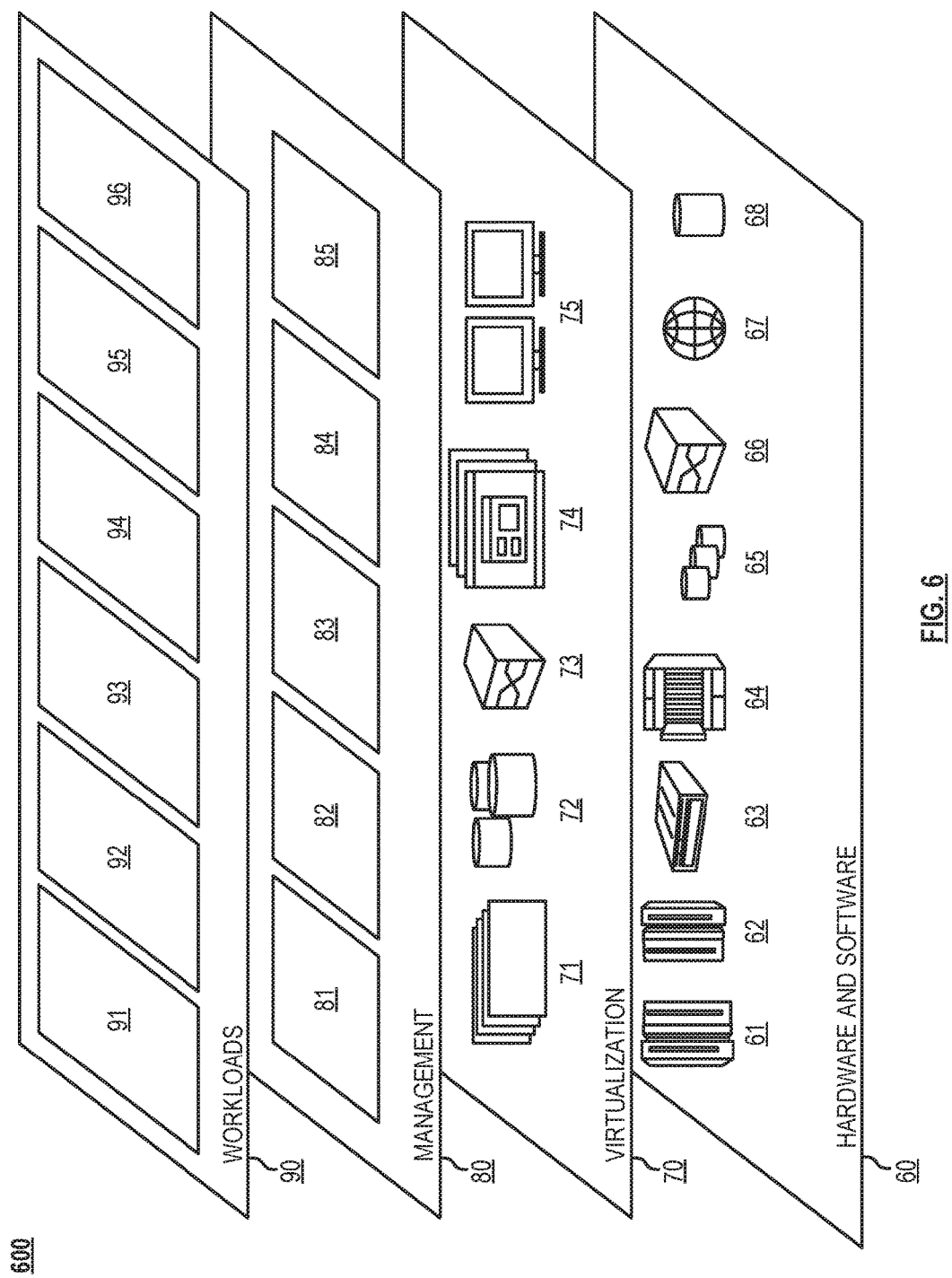
FIG. 6 depicts abstraction model layers according to various embodiments of the present invention.

FIG. 6 depicts abstraction model layers according to various embodiments of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 701 of FIG. 7.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message processing 96.

Figure 7:
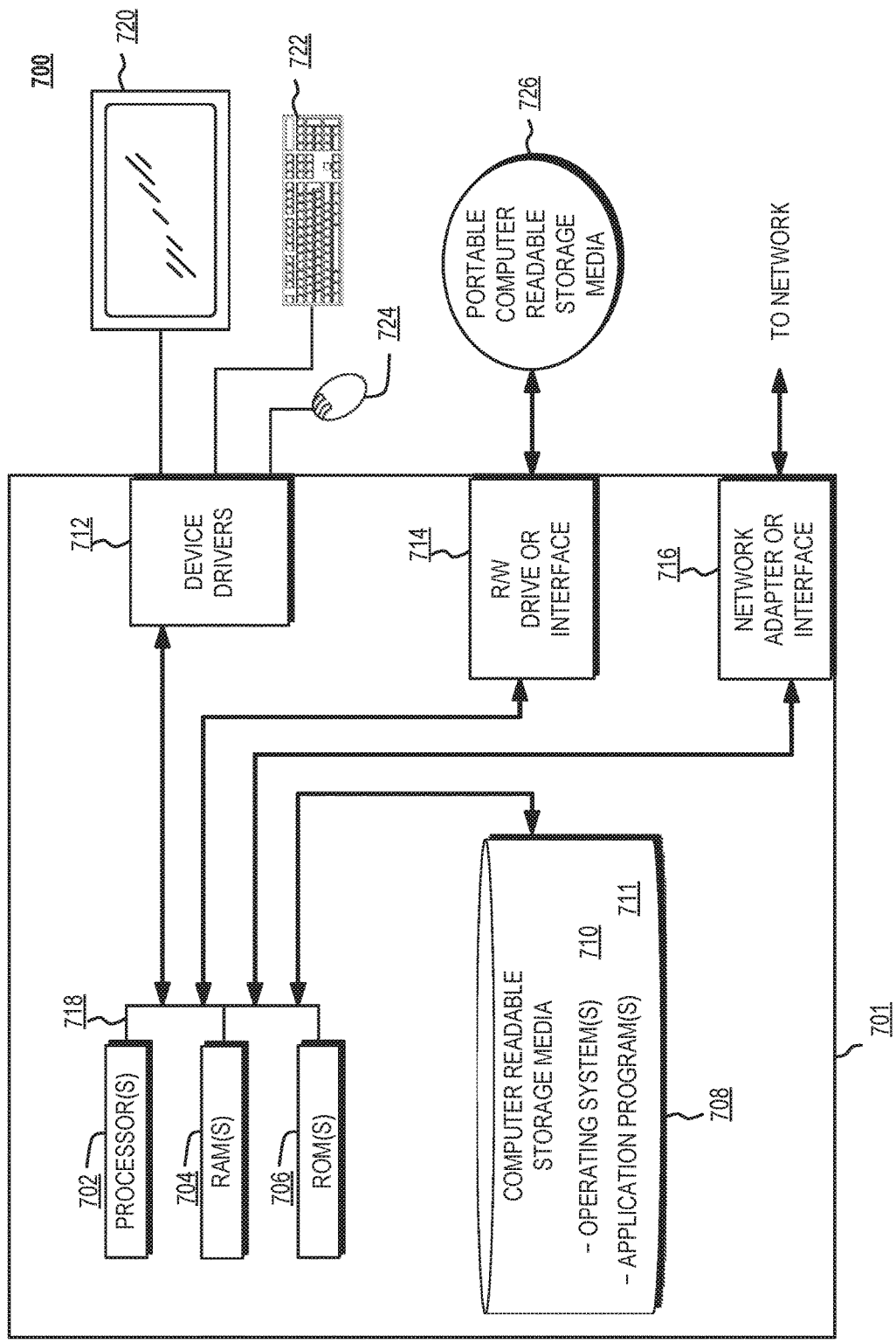
FIG. 7 depicts a block diagram of a computing device according to various embodiments of the present invention.

FIG. 7 depicts a block diagram 700 of a computing device according to various embodiments of the present invention. FIG. 7 depicts a block diagram of components of a computing device 701, which can be utilized to implement some or all of the cloud computing nodes 10, some or all of the computing devices 54A-N of FIG. 5, and/or to implement other computing devices described herein in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 701 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710 and/or application programs 711, such as network application server software 67 and database software 68, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 701 can also include a R/W drive or interface 714 to read from and write to one or more portable computer readable storage media 726. Application programs 711 on computing devices 701 can be stored on one or more of the portable computer readable storage media 726, read via the respective R/W drive or interface 714 and loaded into the respective computer readable storage media 708.

Computing device 701 can also include a network adapter or interface 716, such as a TCP/IP adapter card or wireless communication adapter. Application programs 711 on computing devices 54A-N can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing device 701 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

Generally speaking, various aspects, embodiments, and/or examples of the invention provide means by which a recipient may potentially receive messages while engaged in a certain activity, and depending on that activity and/or the content of the message itself, the content of the message may be modified and/or delivery of the message may be altered. For example, a recipient may be distracted to a certain degree by a message while driving. As some examples, if the message contains negative or joyous news, the distraction may be to such as a degree to affect the ability of the river to perform the activity and, in an extreme and bad case, distract the recipient while driving and potentially cause an accident. This disclosure presents various approaches by which the content of the message may be selectively normalized. For example, a computing device is configured to remove the emotive of the message before delivery. For another example, a computing device is configured to hold back the emotive portion of the message in a first message and follow-up with the emotive portion of the message when the recipient is determined to be able to consume the message without being adversely affected. For another example, the message is modified to generate a normalized message that may be delivered to the recipient without being adversely affecting the recipient (e.g., while the recipient is in a given activity). The emotive content may be neutralized from the message before delivery to the recipient (e.g., change terms to provide more language neutral, more emotive-neutral language, when original message includes content with high anger relevance, stress, etc.).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a communication system;
memory that stores operational instructions; and
processing circuitry operably coupled to the interface and to the memory, wherein the processing circuitry is configured to execute the operational instructions to:
process a message that is provided from a sender and is intended for a recipient associated with another computing device in accordance with at least one of topic, emotive content, or social content to generate a classification model for the message that includes one or more classification parameter values;
based on the classification model for the message comparing favorably to an emotive normalization model:
select a tonal transformation from a plurality of tonal transformations based on the one or more classification parameter values;
process the message in accordance with the tonal transformation that is selected from the plurality of tonal transformations in accordance with modifying content of the message to generate a normalized message;
forward the normalized message to the another computing device to be consumed by the recipient associated with the another computing device;
determine a current activity associated with the recipient associated with the another computing device; and
based on at least one of the one or more classification parameter values comparing favorably to an emotive content threshold and based on the current activity associated with the recipient associated with the another computing device comparing favorably to at least one message-consuming-prohibited activity, forward the normalized message to the another computing device based on the current activity associated with the recipient associated with the another computing device has ended and no other activity associated with the recipient associated with the another computing device comparing favorably to the at least one message-consuming-prohibited activity.

2. The computing device of claim 1, wherein the processing circuitry is further configured to execute the operational instructions to:
process the message iteratively in accordance with at least of the tonal transformation or another tonal transformation that is selected from the plurality of tonal transformations in accordance with modifying content of the message to generate the normalized message.

3. The computing device of claim 1, wherein the processing circuitry is further configured to execute the operational instructions to:
based on the at least one of the one or more classification parameter values comparing favorably to the emotive content threshold and based on the current activity associated with the recipient associated with the another computing device comparing favorably to at least one message-consuming-permitted activity, forward the normalized message to the another computing device to be read aloud for consumption by the recipient associated with the another computing device.

4. The computing device of claim 1, wherein the processing circuitry is further configured to execute the operational instructions to:
based on at least one of the one or more classification parameter values comparing favorably to a first emotive content threshold:
select a first tonal transformation from the plurality of tonal transformations based on the one or more classification parameter values, wherein the first tonal transformation includes a first amount of tonal reduction; and
process the message in accordance with the first tonal transformation that is selected from the plurality of tonal transformations to generate the normalized message; and
based on at least one of the at least one of the one or more classification parameter values or at least one other of the one or more classification parameter values comparing favorably to a second emotive content threshold:
select a second tonal transformation from the plurality of tonal transformations based on the one or more classification parameter values, wherein the second tonal transformation includes a second amount of tonal reduction that is different than the first amount of tonal reduction; and
process the message in accordance with the second tonal transformation that is selected from the plurality of tonal transformations to generate the normalized message.

5. The computing device of claim 1, wherein the one or more classification parameter values of the classification model for the message are based on at least one of anger relevance, disgust relevance, joy relevance, or sadness relevance.

6. The computing device of claim 1, wherein the processing circuitry is further configured to execute the operational instructions, based on the classification model for the message comparing favorably to an emotive normalization model, to:
select the tonal transformation from the plurality of tonal transformations based on the one or more classification parameter values, the sender, the recipient, the topic, the emotive content, and the social content, and a current activity associated with the recipient associated with the another computing device.

7. The computing device of claim 1 further comprising:
a wireless smart phone, a cellular phone, a laptop, a personal digital assistant, a tablet, a personal computers (PC), a work station, or a video game device.

8. The computing device of claim 1, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

9. A computing device comprising:
an interface configured to interface and communicate with a communication system;
memory that stores operational instructions; and
processing circuitry operably coupled to the interface and to the memory, wherein the processing circuitry is configured to execute the operational instructions to:
process a message that is provided from a sender and is intended for a recipient associated with another computing device in accordance with at least one of topic, emotive content, or social content to generate a classification model for the message that includes one or more classification parameter values, wherein the one or more classification parameter values of the classification model for the message are based on at least one of anger relevance, disgust relevance, joy relevance, or sadness relevance;
based on the classification model for the message comparing favorably to an emotive normalization model:
select a tonal transformation from a plurality of tonal transformations based on the one or more classification parameter values; and
process the message in accordance with the tonal transformation that is selected from the plurality of tonal transformations to generate a normalized message; and
based on at least one of the one or more classification parameter values comparing favorably to an emotive content threshold and based on a current activity associated with the recipient associated with the another computing device comparing favorably to at least one message-consuming-prohibited activity, forward the normalized message to the another computing device to be consumed by the recipient associated with the another computing device based on the current activity associated with the recipient associated with the another computing device has ended and no other activity associated with the recipient associated with the another computing device comparing favorably to the at least one message-consuming-prohibited activity.

10. The computing device of claim 9, wherein the processing circuitry is further configured to execute the operational instructions to:
based on at least one of the one or more classification parameter values comparing favorably to an emotive content threshold and based on the current activity associated with the recipient associated with the another computing device comparing favorably to at least one message-consuming-permitted activity, forward the normalized message to the another computing device to be read aloud for consumption by the recipient associated with the another computing device.

11. The computing device of claim 9, wherein the processing circuitry is further configured to execute the operational instructions to:
based on at least one of the one or more classification parameter values comparing favorably to a first emotive content threshold:
select a first tonal transformation from the plurality of tonal transformations based on the one or more classification parameter values, wherein the first tonal transformation includes a first amount of tonal reduction; and
process the message in accordance with the first tonal transformation that is selected from the plurality of tonal transformations to generate the normalized message; and
based on at least one of the at least one of the one or more classification parameter values or at least one other of the one or more classification parameter values comparing favorably to a second emotive content threshold:
select a second tonal transformation from the plurality of tonal transformations based on the one or more classification parameter values, wherein the second tonal transformation includes a second amount of tonal reduction that is different than the first amount of tonal reduction; and
process the message in accordance with the second tonal transformation that is selected from the plurality of tonal transformations to generate the normalized message.

12. The computing device of claim 9 further comprising:
a wireless smart phone, a cellular phone, a laptop, a personal digital assistant, a tablet, a personal computers (PC), a work station, or a video game device.

13. The computing device of claim 9, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

14. A method for execution by a computing device, the method comprising:
processing a message that is provided from a sender and is intended for a recipient associated with another computing device in accordance with at least one of topic, emotive content, or social content to generate a classification model for the message that includes one or more classification parameter values;
based on the classification model for the message comparing favorably to an emotive normalization model:
selecting a tonal transformation from a plurality of tonal transformations based on the one or more classification parameter values;
processing the message in accordance with the tonal transformation that is selected from the plurality of tonal transformations in accordance with modifying content of the message to generate a normalized message; and
forwarding, via an interface of the computing device that is configured to interface and communicate with a communication system, the normalized message to the another computing device to be consumed by the recipient associated with the another computing device;
determining a current activity associated with the recipient associated with the another computing device; and
based on at least one of the one or more classification parameter values comparing favorably to an emotive content threshold and based on the current activity associated with the recipient associated with the another computing device comparing favorably to at least one message-consuming-permitted activity, forwarding, via the interface, the normalized message to the another computing device to be read aloud for consumption by the recipient associated with the another computing device.

15. The method of claim 14 further comprising:
based on the at least one of the one or more classification parameter values comparing favorably to the emotive content threshold and based on the current activity associated with the recipient associated with the another computing device comparing favorably to at least one message-consuming-prohibited activity, forwarding, via the interface, the normalized message to the another computing device based on the current activity associated with the recipient associated with the another computing device has ended and no other activity associated with the recipient associated with the another computing device comparing favorably to the at least one message-consuming-prohibited activity.

16. The method of claim 14 further comprising:
processing the message iteratively in accordance with at least of the tonal transformation or another tonal transformation that is selected from the plurality of tonal transformations in accordance with modifying content of the message to generate the normalized message.

17. The method of claim 14 further comprising:
based on at least one of the one or more classification parameter values comparing favorably to a first emotive content threshold:
  selecting a first tonal transformation from the plurality of tonal transformations based on the one or more classification parameter values, wherein the first tonal transformation includes a first amount of tonal reduction; and
  processing the message in accordance with the first tonal transformation that is selected from the plurality of tonal transformations to generate the normalized message; and
based on at least one of the at least one of the one or more classification parameter values or at least one other of the one or more classification parameter values comparing favorably to a second emotive content threshold:
  selecting a second tonal transformation from the plurality of tonal transformations based on the one or more classification parameter values, wherein the second tonal transformation includes a second amount of tonal reduction that is different than the first amount of tonal reduction; and
  processing the message in accordance with the second tonal transformation that is selected from the plurality of tonal transformations to generate the normalized message.

18. The method of claim 14 further comprising, based on the classification model for the message comparing favorably to an emotive normalization model:
selecting the tonal transformation from the plurality of tonal transformations based on the one or more classification parameter values, the sender, the recipient, the topic, the emotive content, and the social content, and a current activity associated with the recipient associated with the another computing device, wherein the one or more classification parameter values of the classification model for the message are based on at least one of anger relevance, disgust relevance, joy relevance, or sadness relevance.

19. The method of claim 14, wherein the computing device includes a wireless smart phone, a cellular phone, a laptop, a personal digital assistant, a tablet, a personal computers (PC), a work station, or a video game device.

20. The method of claim 14, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

* * * * *